United States Patent
Carrillo et al.

(10) Patent No.: US 9,382,929 B2
(45) Date of Patent: Jul. 5, 2016

(54) COMPOSITE CLAMP

(71) Applicant: The Boeing Company, Chicago, IL (US)

(72) Inventors: James P. Carrillo, Renton, WA (US); Khashayar Borumand, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 294 days.

(21) Appl. No.: 13/735,762

(22) Filed: Jan. 7, 2013

(65) Prior Publication Data

US 2014/0189986 A1    Jul. 10, 2014

(51) Int. Cl.
  F16B 5/06   (2006.01)
  F16B 2/24   (2006.01)
  B64C 1/40   (2006.01)
  F16B 5/12   (2006.01)

(52) U.S. Cl.
  CPC . *F16B 2/24* (2013.01); *B64C 1/403* (2013.01); *F16B 5/121* (2013.01); *F16B 5/0657* (2013.01); *Y10T 24/44932* (2015.01)

(58) Field of Classification Search
  None
  See application file for complete search history.

(56) References Cited

U.S. PATENT DOCUMENTS

| 3,515,364 | A | * | 6/1970 | Spicer ........................ 248/74.3 |
| 4,055,874 | A | * | 11/1977 | Brown ........................ 24/67.3 |
| 4,105,814 | A | | 8/1978 | Eggert |
| 4,219,064 | A | | 8/1980 | Lozano |
| 5,680,680 | A | | 10/1997 | LaConte |
| 6,358,591 | B1 | | 3/2002 | Smith |
| 7,374,132 | B2 | * | 5/2008 | Shumate et al. ........... 244/129.1 |

FOREIGN PATENT DOCUMENTS

| EP | 0 006 106 | 1/1980 |
| EP | 2 518 333 | 10/2012 |
| GB | 1 182 244 | 2/1970 |
| GB | 1 331 504 | 9/1973 |
| GB | 2 473 461 | 3/2011 |
| JP | H10 252717 | 9/1998 |

OTHER PUBLICATIONS

International Search Report and Written Opinion, PCT/US2013/074229 (2014).
*International Preliminary Report on Patentability*, PCT/US2013/074229 (Jul. 16, 2015).

* cited by examiner

*Primary Examiner* — Jack W Lavinder
(74) *Attorney, Agent, or Firm* — Walters & Wasylyna LLC

(57) ABSTRACT

A composite clamp including a continuous metallic spine having a first end bending back upon a second end forming a loop, a first arm, and a second arm approximately parallel to the first arm, and a polymer casing surrounding the metallic spine from proximate the first end to proximate the second end.

20 Claims, 4 Drawing Sheets

COMPOSITE CLAMP

FIELD

The present disclosure is generally related to clamps and, more particularly, to a metal/polymer composite spring clamp.

BACKGROUND

Commercial airplanes include thermal and acoustic insulation materials to meet requirements for thermal, acoustic and moisture management within the pressurized cabin. Typically, airplanes utilize thermal/acoustic insulation blankets, which are placed adjacent to the interior skin of the aircraft's fuselage, between fuselage structural frame members. The insulation blankets are typically constructed of a fibrous lofted insulation material, such as fiberglass batting, foam or other buildups encased within protective covering films, and are suitably sized to fit snugly between the fuselage frame members and are fastened to the frame members by spring clamps or clips.

Any thermal/acoustic insulation materials, including the means of fastening the insulation materials to the fuselage, must meet certain criteria defined by the Code of Federal Regulations, particularly 14 C.F.R. §25 (also referred to as FAR Part 25). For example, the insulation blankets and fastening clamps must meet flame penetration resistance test requirements (25.856(a)) or burnthrough requirements (25.856(b)) as defined by the CFR. Additionally, the fastening clamps must meet certain corrosion resistance properties.

To meet current burnthrough and corrosion resistance requirements, insulation clamps typically utilize stainless spring steel or other aerospace steels. Such steel insulation clamps account for unnecessary weight and cost to the production of airplanes. Nylon or polyether ether ketone (PEEK) clamps do not have the retention properties of spring steel and may lose their shape over time. Carbon steel cannot be heat-treated and is also heavy and expensive.

Accordingly, those skilled in the art continue with research and development efforts in the field of airworthiness standards related to fire penetration and resistance.

SUMMARY

In one configuration, the disclosed composite clamp may include a continuous metallic spine having a first end bending back upon a second end forming a loop, a first arm, and a second arm parallel to the first arm, and a polymer casing surrounding the metallic spine from proximate the first end to proximate the second end.

In another configuration, the disclosed composite clamp may include a continuous strip having a first end bending back upon a second end forming a loop, a first arm, and a second arm parallel to the first arm, wherein the strip includes a polymer casing and a metallic spine embedded within said polymer casing extending proximate the first end to proximate the second end.

In yet another configuration, disclosed is a method of manufacturing a composite clamp, the method may include the steps of: (1) providing a continuous metallic spine having a first end bent back upon a second end forming a loop, a first arm, and a second arm parallel to the first arm and (2) applying a polymer casing over the metallic spine.

Other configurations of the disclosed composite clamp will become apparent from the following detailed description, the accompanying drawings and the appended claims.

DETAILED DESCRIPTION

Figure 1:
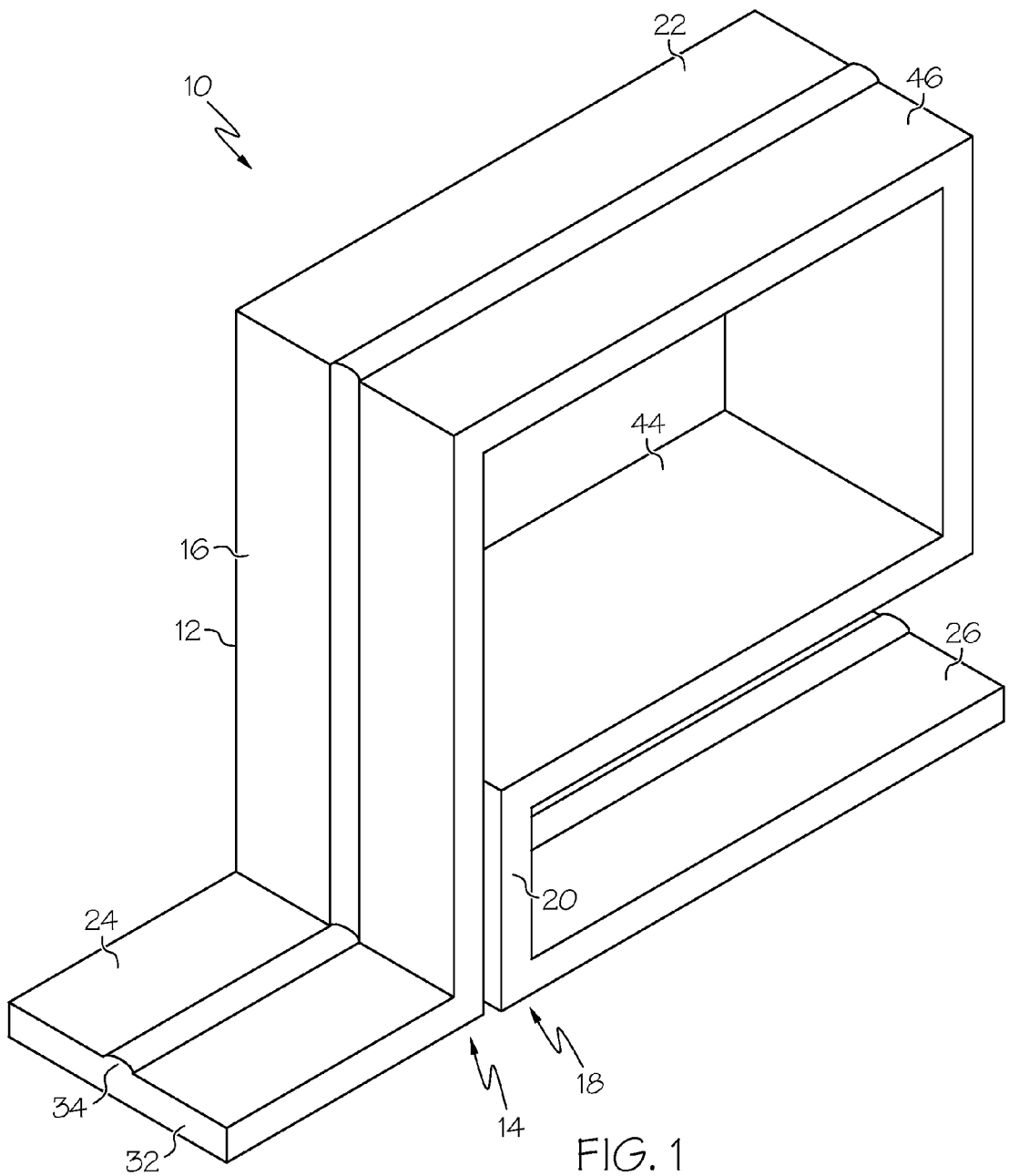
FIG. 1 is a perspective view of one configuration of the disclosed composite clamp.

The following detailed description refers to the accompanying drawings, which illustrate specific configurations of the disclosure. Other configurations having different structures and operations do not depart from the scope of the present disclosure. Like reference numerals may refer to the same element or component in the different drawings.

Figure 2:
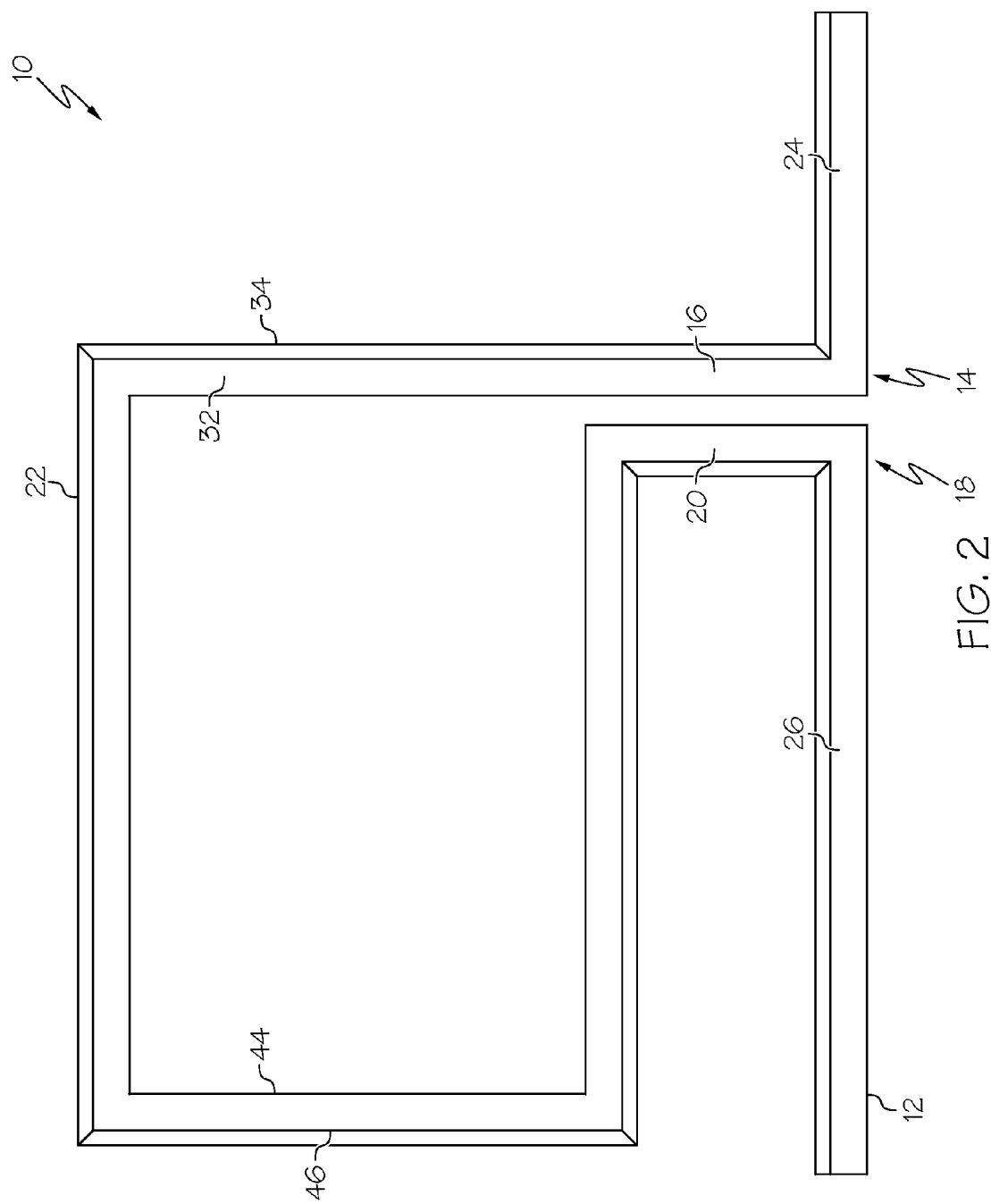
FIG. 2 is a side elevational view of the composite clamp of FIG. 1.

Referring to FIGS. 1 and 2, one configuration of the disclosed composite clamp, generally designated 10, may include a generally flat strip 12 of composite material. The composite material may generally be formed of a polymer portion and a metal portion having spring like properties. The metal portion may be disposed (e.g., embedded) within the polymer portion. The strip 12 may be bent back upon itself such that a first end 14 of the strip 12 forms a first arm 16 and a second end 18 forms a second arm 20. The strip 12 may be bent such that the first arm 16 and the second arm 20 are held in essentially a parallel relationship with respect to each other.

The remainder of the strip 12 may be bent as illustrated to form a loop 22 between the first end 14 and second end 18. The loop 22 may be generally rectangular-shaped as illustrated. It can be appreciated by one skilled in the art that the loop 22 may also include other geometric shapes, including circular, ovular, square, or the like and as such the illustrated configuration is not meant to be limiting in any manner.

The first arm 16 may include a first flange 24 that may be bent outwardly at an angle proximate the first end 14. For example, as illustrated, the first flange 24 may extend perpendicularly from the first arm 16. The second arm 20 may include a second flange 26 that may be bent outwardly at an angle proximate the second end 18. For example, as illustrated, the second flange 26 may extend perpendicularly from the second arm 20.

Figure 3:
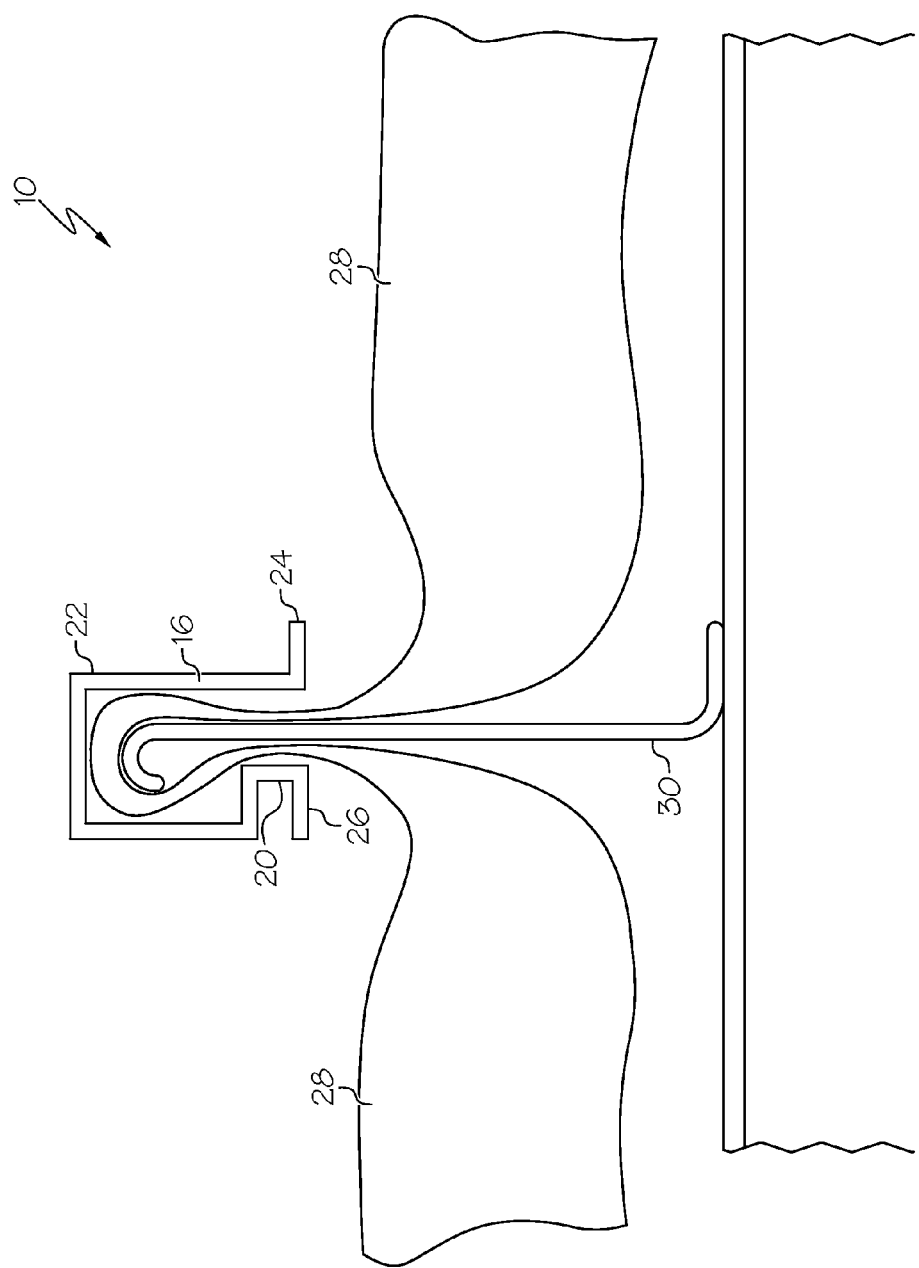
FIG. 3 is a side environmental view of the composite clamp of FIG. 2, shown in use.

As shown in FIG. 3, the flanges 24, 26 may provide an engageable surface to spread the first arm 16 and second arm 20 apart when applying the composite clamp 10 to fasten an insulation blanket 28 to a frame member 30 of the fuselage of an aircraft. The composite clamp 10 may be expanded, by spreading the first arm 16 and second arm 20, and placed over the frame member 30. The insulation blanket 28 may be inserted between the opposed arms 16, 20 and around the frame member 30 within the loop 22. Alternatively, the insulation blanket 28 may be placed over the frame member 30 and the composite clamp 10 may be expanded and placed over the insulation blanket 28 and frame member 30. The composite clamp 10 may be released to hold the insulation blanket 28 against the frame member 30 by spring tension. The same composite clamp 10 may be used to hold adjoining insulation blankets 28 to both sides of the same frame member 30. A plurality of composite clamps 10 may be placed along the frame member 30 at regular intervals.

In one configuration, the loop 22 may generally extend outwardly from the first arm 16, such that the loop 22 may be offset from center and the first arm 16 forms one side of the loop 22, as illustrated in the figures. It can be appreciated by one skilled in the art that the configuration of the loop 22 may vary based upon the size and shape of the frame member 30 to which the composite clamp 10 may be attached.

Figure 4:
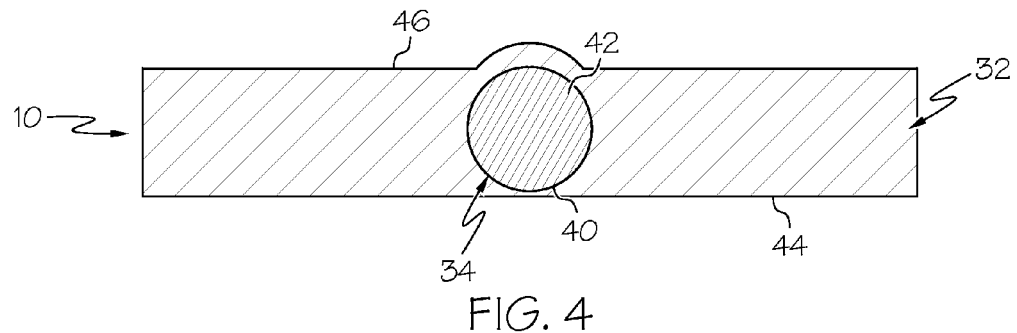
FIG. 4 is a cross-sectional view of one configuration of the disclosed composite clamp.

Referring to FIG. 4, the composite clamp 10 may include a polymer casing 32 and a continuous metallic spine 34 extending from proximate the first end 14 to proximate the second end 18 of the strip 12. The composite clamp 10 may provide a lightweight solution for fastening the insulation blanket 28 to the frame member 30 by utilizing the retention and tensile strength of the metallic spine 34 which may be embedded within the lightweight polymer casing 32. The polymer casing 32 may provide the necessary surface area to clamp, clip, or otherwise fasten the insulation blanket 28 to the frame member 30. The polymer casing 32 may not damage the material of the insulation blanket 28 and may eliminate the risk of corrosion to other surrounding metallic structures of the fuselage.

One method of manufacturing the composite clamp 10 may include insert injection molding, whereby plastic is injected into a mold cavity and around an inserted metallic spine 34 placed into the same mold cavity prior to molding. The result may be a single piece clamp or clip with the metallic spine 34 encapsulated by the polymer casing 32.

Mechanical bonding may occur in the insert injection molding of the metallic spine 34 within the polymer casing 32. The mechanical bonding may take place by the shrinking of the encapsulating resin (i.e., the polymer casing 32) around the metallic spine 34 as the resin cools. Optionally, the metallic spine 34 may include irregularities in its surface 40 to provide additional physical strength to the composite clamp 10 by surrounding the irregularities of the surface 40 by the shrinking of the encapsulating resin (i.e., the polymer casing 32). For example, the surface 40 of the metallic spine 34 may include some means of mechanical retention such as a sandblasted, flared, or knurled surface 40.

Figure 5:
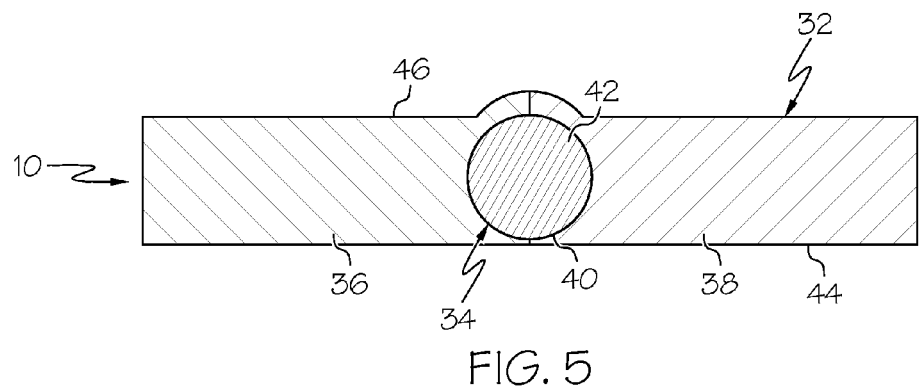
FIG. 5 is a cross-sectional view of another configuration of the disclosed composite clamp.

Referring to FIG. 5, in another configuration of the disclosed composite clamp 10 the polymer casing 32 may include a first polymer portion 36 and a second polymer portion 38. The metallic spine 34 may be sandwiched between the first polymer portion 36 and the second polymer portion 38 during fabrication of the composite clamp 10. One method of manufacturing such a composite clamp 10 may include co-injection molding to mold the multi-layered composite clamp 10 having a laminated structure. For example, the first polymer portion 36 (e.g., first half) of the composite clamp 10 may be injection molded. The metallic spine 34 may be inlayed with the first polymer portion 36. The second polymer portion 38 (e.g., second half) of the composite clamp 10 may then be injection molded to the first polymer portion 36 surrounding the metallic spine 34. It can be appreciated by one skilled in the art that the first polymer portion 36 and the second polymer portion 38 may not have equivalent lateral dimensions (i.e., may not be exactly halves of the composite clamp 10 or strip 12) as illustrated in the figures. It can also be appreciated by one skilled in the art that the lateral position of the metallic spine 34 may be optimized depending upon the molding process.

It can be appreciated by one skilled in the art that other plastic molding techniques may also be used to form the composite clamp 10 and the described methods are for the purpose of illustration and not meant to be limiting in any manner. For example, other methods may include dip molding, compression molding, thermoforming, resin transfer molding, or the like.

The polymer casing 32 may include any suitable polymerizable material. For example, the polymer casing 32 may be formed from thermoset or thermoplastic elastomers or similar materials that possess elastic properties and have undergone vulcanization or conversion into a finished article. Alternatively, the polymer casing 32 may include any synthetic plastic material, such as latex.

As illustrated in FIGS. 4 and 5, the metallic spine 34 may include a metal wire 42. The metal wire 42 may be made from spring steel, high carbon spring steel, or other suitably resilient metal material having spring like properties. Alternatively, the metal wire 42 may be made from various metallic alloys or lower grade metallic materials. The metal wire 42 may have various diameters based on factors such as the desired spring tension and retention force needed or cost and weight characteristics. For example, the diameter of the metal wire 42 may be larger than the thickness of the polymer casing 32, as illustrated. Alternatively, the metal wire 42 may have a diameter smaller than the thickness of the polymer casing 32 such that the interior surface 44 and the exterior surface 46 of the strip 12 may be flat. The metal wire 42 may also be heat-treated or otherwise prepared to provide a desired hardness, tensile strength, or fatigue value. The metal wire 42 may optionally include an exterior coating to protect the metal components against corrosion or degradation due to moisture, salt spray, oxidation or exposure to a variety of environmental conditions.

The metal wire 42 may be pre-bent or otherwise formed into the bent configuration of the strip 12 of the composite clamp 10 prior to being encapsulated within the polymer casing 32. For example, the metal wire 42 may be bent back upon itself such that a first end forms a first arm and a longitudinally opposed second end forms a second arm, corresponding to the ends 14, 18 and arms 16, 20 of the strip 12. The metal wire 42 may be bent such that the first arm and the second arm are held in essentially a parallel relationship with respect to each other. The remainder of the metal wire 42 may be bent between the first end and second end to form a loop. Each end of the metal wire 42 may also be bent up in an angle corresponding to the first flange 24 and second flange 26 of the strip 12.

Figure 6:
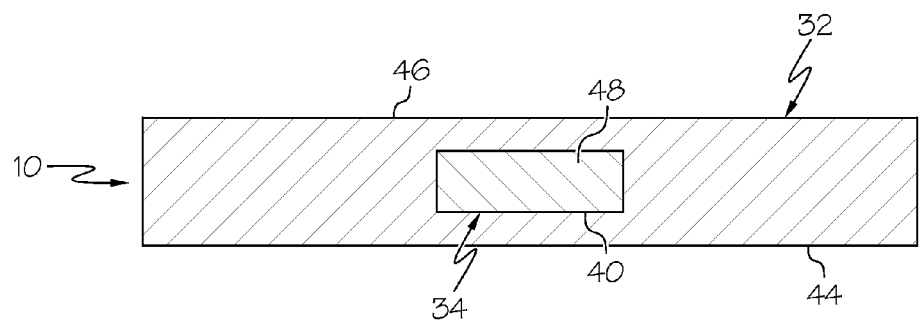
FIG. 6 is a cross-sectional view of yet another configuration of the disclosed composite clamp.

Referring to FIG. 6, in yet another configuration of the disclosed composite clamp 10, the metallic spine 34 may include a metal strip 48. The metal strip 48 may be a flat metal wire or a flat metal sheet. The metal strip 48 may be made from spring steel, high carbon spring steel, or other suitably resilient metal material having spring like properties. Alternatively, the metal strip 48 may be made from various metallic alloys or lower grade metallic materials. The metal strip 48 may have various lateral widths and thicknesses based on factors such as the desired spring tension and retention force needed or cost and weight characteristics. The metal strip 48 may also be heat-treated or otherwise prepared to provide a desired hardness, tensile strength, or fatigue value. The metal strip 48 may optionally include an exterior coating (e.g., a corrosion resistant material) to protect the metal components against corrosion or degradation due to moisture, salt spray, oxidation or exposure to a variety of environmental conditions.

The metal strip 48 may be pre-bent or otherwise formed into the bent configuration of the strip 12 of the composite clamp 10 prior to being encapsulated by the polymer casing 32. For example, the metal strip 48 may be bent back upon itself such that a first end forms a first arm and a longitudinally opposed second end forms a second arm, corresponding to the ends 14, 18 and arms 16, 20 of the strip 12. The metal strip 48 may be bent such that the first arm and the second arm are held in essentially a parallel relationship with respect to each other. The remainder of the metal strip 48 may be bent between the first end and second end to form a loop. Each end of the metal strip 48 may also be bent up in an angle corresponding to the first flange 24 and second flange 26 of the strip 12.

The reduced amount of metal material of the metallic spine 34 may minimize the overall weight of the composite clamp 10 while still providing resilient spring durability and retention shape over time. A benefit of the use of the composite clamp 10 to fasten insulation blankets 28 to frame members 30 of airplanes may be that the metallic spine 34 may meet the codified melting temperature requirements while reducing the overall cost and weight of airplane production. The polymer casing 32 may provide sufficient surface area to fasten the insulation blanket 28 to the frame member 30 and may melt away in extreme heat conditions while leaving the metallic spine 34 to retain the insulation blanket 28 to the frame member 30 to satisfy airplane compliance standards. Another benefit of the composite clamp 10 may be that the polymer casing 32 may use elastomers with lower flexibility and retention properties as the metallic spine 34 provides the elasticity and retention features of the composite clamp 10. Another benefit of the composite clamp 10 may be the minimization of corrosion of the airplane frame or other surrounding metal structures if the insulation blanket were to decay over time since the metallic spine 34 is not in physical contact with the surrounding metal structures. Yet still another benefit may be a reduced chance of injury to mechanics or those constructing the airplane as current spring steel clamps or clips have a tendency to fracture when expanded and applied to the frame member 30, which may project sharp metal shards toward the face of a worker.

It can be appreciated by one skilled in the art that the composite clamp 10 may not be limited to use in the aerospace industry or, more particularly, for fastening insulation blankets 28 within the fuselage of an airplane. The composite clamp 10 may be useful in any application where cost and weight of production may be a concern or issue, where extreme temperature conditions may be involved, or where possible corrosion avoidance is desired.

Although various configurations of the disclosed composite clamp have been shown and described, modifications may occur to those skilled in the art upon reading the specification. The present application includes such modifications and is limited only by the scope of the claims.

What is claimed is:

1. A thermal, acoustic and moisture management system for an aircraft comprising:
    a frame member of a fuselage of said aircraft, said frame member comprising a first end and an opposed second end;
    a thermal, acoustic and moisture blanket positioned over at least a portion of said frame member; and
    a composite clamp positioned over said blanket to secure said blanket between said composite clamp and said second end of said frame member, said composite clamp comprising:
        a first end bending back upon a second end to form a first arm, a second arm parallel to said first arm, and a loop between said first arm and said second arm defining a cavity to receive said second end of said frame member and said blanket;
        a metallic spine extending from said first end to said second end of said composite clamp; and
        a polymer casing at least partially surrounding said metallic spine, said polymer casing extending laterally outward from opposing sides of said metallic spine defining a lateral dimension of said composite clamp, said metallic spine extending along a center of said lateral dimension of said composite clamp,
    wherein at least a portion of said blanket and said frame member are received within said cavity defined by said loop; and
    wherein at least another portion of said blanket and said frame member are positioned between said first arm and said second arm.

2. The system of claim 1 wherein said polymer casing extends continuously from said first end to said second end of said composite clamp, and wherein an inner surface of said first arm, said second arm, and said loop is flat.

3. The system of claim 1 wherein said polymer casing fully surrounds said metallic spine from said first end to said second end of said composite clamp.

4. The system of claim 1 wherein said polymer casing comprises a first lateral polymer portion and a second lateral polymer portion, and wherein said metallic spine is disposed between said first lateral polymer portion and said second lateral polymer portion.

5. The system of claim 1 wherein said polymer casing comprises an elastomer material.

6. The system of claim 1 wherein said metallic spine comprises a metal strip having at least one of a round cross section and a rectangular cross section.

7. The system of claim 1 wherein said loop is spaced away from at least a portion of said blanket such that at least a portion of said cavity defined by said loop is open.

8. The system of claim 1 wherein said metallic spine is coated with a corrosion resistant material.

9. The system of claim 1 wherein said polymer casing comprises an injection molded plastic applied over said metallic spine.

10. The system of claim 1 wherein said polymer casing comprises a molded plastic applied over said metallic spine.

11. The system of claim 1 wherein said composite clamp further comprises a first flange extending perpendicularly outward from said first arm at said first end and a second flange extending perpendicularly outward from said second arm at said second end.

12. A composite clamp for securing a thermal, acoustic and moisture blanket to a frame member of a fuselage of an aircraft, said composite clamp comprising:
    a first end bending back upon a second end to form a first arm, a second arm parallel to said first arm, and a loop between said first arm and said second arm defining a cavity;
    a polymer casing extending from said first end to said second end and defining a lateral dimension of said composite clamp; and
    a metallic spine embedded within said polymer casing and disposed along a center of said lateral dimension of said composite clamp,
    wherein at least a portion of said blanket and said frame member are received within said cavity defined by said loop, and
    wherein at least another portion of said blanket and said frame member are positioned between said first arm and said second arm.

13. The composite clamp of claim 12 wherein said metallic spine extends from said first end to said second end of said composite clamp.

14. The composite clamp of claim 12 wherein said polymer casing comprises a first lateral polymer portion and a second lateral polymer portion, and wherein said metallic spine is disposed between said first lateral polymer portion and said second lateral polymer portion.

15. The composite clamp of claim 12 wherein said polymer casing comprises an elastomer material.

16. The composite clamp of claim 12 wherein said metallic spine comprises a metal strip having at least one of a round cross section and a rectangular cross section.

17. The composite clamp of claim 12 wherein said loop is spaced away from at least a portion of said blanket such that at least a portion of said cavity defined by said loop is open.

18. A method for thermal, acoustic and moisture management of an aircraft, said method comprising the steps of:

positioning a thermal, acoustic and moisture blanket over at least a portion of a frame member of a fuselage of said aircraft;

positioning a composite clamp over said blanket to secure said blanket between said composite clamp and said frame member, said composite clamp comprising:

a first end bending back upon a second end to form a first arm, a second arm parallel to said first arm, and a loop between said first arm and said second arm defining a cavity;

a metallic spine extending from said first end to said second end of said composite clamp; and a polymer casing surrounding said metallic spine, said polymer casing extending laterally outward from opposing sides of said metallic spine defining a lateral dimension of said composite clamp;

receiving at least a portion of said blanket and said frame member within said cavity defined by said loop; and positioning at least another portion of said blanket and said frame member between said first arm and said second arm.

19. The method of claim 18 wherein said loop is spaced away from at least a portion of said blanket such that at least a portion of said cavity defined by said loop is open.

20. The method of claim 18 wherein said composite clamp further comprises a first flange extending perpendicularly outward from said first arm at said first end and a second flange extending perpendicularly outward from said second arm at said second end.

\* \* \* \* \*